United States Patent [19]

Althuber et al.

[11] 4,264,027
[45] Apr. 28, 1981

[54] CAPSTAN DRIVE FOR A TAPE

[75] Inventors: Horst Althuber, Vienna, Austria; Heinz Dimigen; Hubertus Hübsch, both of Hamburg, Fed. Rep. of Germany

[73] Assignee: U.S. Philips Corporation, New York, N.Y.

[21] Appl. No.: 90,160

[22] Filed: Oct. 31, 1979

[30] Foreign Application Priority Data

Nov. 2, 1978 [DE] Fed. Rep. of Germany ....... 2847493

[51] Int. Cl.³ ............................................. B65H 17/22
[52] U.S. Cl. ..................................... 226/182; 226/194
[58] Field of Search ............... 226/182, 190, 193, 194; 100/155 R; 29/148.4 D

[56] References Cited

U.S. PATENT DOCUMENTS

| 2,024,007 | 12/1935 | McColloch et al. | 226/193 X |
| 3,141,593 | 7/1964 | Selsted et al. | 226/193 |

Primary Examiner—Leonard D. Christian
Attorney, Agent, or Firm—David R. Treacy

[57] ABSTRACT

The driving arrangement for a magnetic tape is comprised of a drive shaft having a smooth surface and a pressure roller having a high surface friction coefficient. The circumference of the drive shaft is provided with a thin layer of the borides, nitrides or carbides of a hard metal, which increases the friction resistance of the shaft. This measure reduces the slip, without affecting the proper uniform travel of the tape.

3 Claims, 1 Drawing Figure

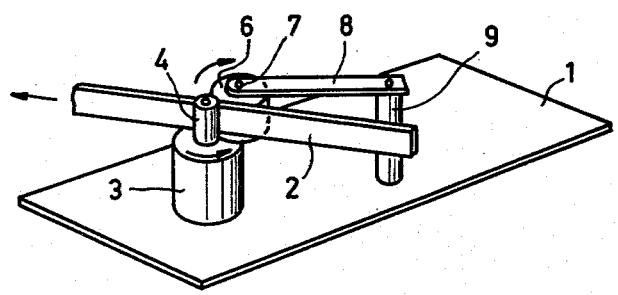

BACKGROUND OF THE INVENTION

The invention relates to a driving arrangement for a record carrier in the form of tape, comprising a driven shaft and driving the record carrier, and a pressure roller having a high surface friction coefficient, the tape-like record carrier being passed between shaft and roller.

Driving a record carrier in the form of tape having a smooth surface, for example a magnetic tape, is usually performed by means of friction between two shafts or small drums, one shaft or drum being the element driving the record carrier, the other shaft or drum being the pressure element producing the counter pressure required for driving the record carrier. The first mentioned shaft or drum has a surface which is of a highest possible smoothness and, consequently, of a lowest possible friction, at least in the area where it contacts the record carrier. This smooth surface is necessary to ensure uniform travel of the record carrier perpendicularly to its longitudinal axis, which is necessary for the tone quality. Therefore, the drive shaft or small drum is denoted the capstan and the second shaft or small drum the pressure roller.

As known, however, the smooth surface of the capstan has drawbacks which are predominantly caused by the slip which is produced when the capstan must be rapidly brought to a high speed of rotation. This is, for example, the case when tape recorders are operated in the fast mode. This slip is also annoying with smooth tape-like record carriers which are used in data recorders in accounting machines and which are transported in the so-called start-stop mode.

To avoid this drawback it has been proposed to coat not only the pressure roller, but also the capstan itself with a friction layer (see, for example, IBM Technical Disclosure Bulletin, Vol. 11. No. 2, July 1968). As a result thereof the record carrier may indeed be brought relatively rapidly to the desired tape speed, but this is done at the expense of the uniform travel perpendicularly to the longitudinal axis of the record carrier as is required for high tone quality. The reason is the rapid wear of the soft surfaces of the capstan and the pressure roller, and the dependence of the layer properties on the ambient humidity.

SUMMARY OF THE INVENTION

The invention has for its object to provide a driving arrangement for a tape-like record carrier allowing a desired high tape speed to be obtainable as well as the maintenance of a uniform travel of the tape as required for high tone quality and for a perfect readout of stored data. Furthermore, the static friction between the tape-like record carrier and the capstan must be made independent of the influence of the ambient humidity as far as possible.

This object is accomplished in that the driven shaft is provided, at least in the area of contact with the record carrier, over its overall circumference with a 0.01 to 10 $\mu$m thick layer, containing a boride, nitride, carbide or oxycarbide of a hard metal. It appears that thin, sputtered layers of materials such as titanium carbide or mixtures of boron nitride and titanium nitride on the driven shaft (the capstan) considerably increase the adhesion between the tape and the capstan. Layers which are 0.1 to 1 $\mu$m thick are very advantageous. Other suitable materials are, for example, tungsten and molybdenum carbide and tantalum carbide.

The invention and its advantages will now be further described with reference to an example shown in the sole drawing.

BRIEF DESCRIPTION OF THE DRAWING

The sole FIGURE is a diagrammatic perspective view of a capstan and pressure roller drive in which the invention may be used.

DESCRIPTION OF THE PREFERRED EMBODIMENT

The drawing shows schematically a known driving arrangement for a magnetic tape 2. An electric motor 3 driving a capstan 4 in the direction indicated by the arrow is mounted to a bottom plate (1). A supporting pin 9 is also fitted to this plate 1, a pivoting arm 8 being fitted rotatingly to the free end of this pin 9. A pressure roller 6 is supported at the free end of the pivoting arm 8 in a journal bearing 7. The pivoting arm 8 is spring-biased in a manner not shown, the spring pressure pressing the pressure roller 6 in the operating position as shown continually against the capstan 4, and keeping it disengaged from the capstan 4 in the non-operating condition, not shown. The magnetic tape 2 is passed between the capstan 4 and the pressure roller 6. When the electric motor 3 is operated in the direction indicated by the arrow, the magnetic tape 2 and the pressure roller 6 are always moved into the direction indicated by the arrow.

On its surface, at least in the area of contact with the magnetic tape 2, the capstan 4 is provided with a thin layer of a boride, nitride, carbide or oxycarbide of a metal. The layer is between 0.01 and 10 $\mu$m, preferably between 0.1 and 1 $\mu$m thick. In one example the thin layer was deposited by means of high-frequency cathode sputtering in high-vacuum, a titanium carbide target having a diameter of 15 cm being sputtered at a high frequency power of approximately 1 kW in an argon-oxygen atmosphere. At a pressure of approximately $10^{-2}$ Torr inside the sputtering device and a substrate temperature of approximately 150° C., an approximately 1 $\mu$m thick layer was formed on the capstan 4. The rate of deposition was approximately 65 Å/min. The titanium-oxycarbide layer thus produced appeared to be very hard. Slip measurements between a capstan coated in this way and the magnetic tape showed that, compared with a capstan having a smooth surface, this slip could become so small as to be almost negligible.

An ion plating method may alternatively be used instead of high-frequency cathode sputtering.

In this method the substrate to be coated is brought to a negative potential. As the plating-jar (as for cathode sputtering) contains argon at a low pressure (1–30 mTorr) a gas discharge is produced. The atomic particles released from a source are energized in the gas discharge and partly ionized; they strike the substrate with great force, resulting in an excellent adhesive strength of the layers.

Furthermore, a chemical vapour deposition (CVD) process can be employed to produce the layer. In this procedure the compounds from which the layer to be formed is built up are introduced as gaseous chemical compounds into a reaction vessel. On the heated substrate the gases are reached to form the desired layer. Example: $TiCl_4 + CH_4 \rightarrow TiC\ (+4HCl)$. Reaction of the gases can alternatively be caused by applying a high-frequency field to them (so-called Plasma-activated CVD procedure).

What is claimed is:

1. A driving arrangement for a tape, comprising a driven shaft for driving the tape, and a pressure roller having a high surface friction coefficient, wherein, at least at the area of the shaft which contacts the tape, the shaft comprises an overall circumferential layer, 0.01 to 10 μm thick, containing a boride, nitride, carbide or oxycarbide of a hard metal.

2. A driving arrangement as claimed in claim 1, wherein layer is 0.01 to to 1 μm thick.

3. A driving arrangement as claimed in claim 1 or 2, wherein said layer consists of at least one material selected from the group consisting of titanium carbide, titanium oxycarbide, boron nitride and titanium nitride.

* * * * *